Aug. 18, 1942.  A. DRUCKER  2,293,598
CAMERA
Filed Feb. 26, 1940   2 Sheets-Sheet 1
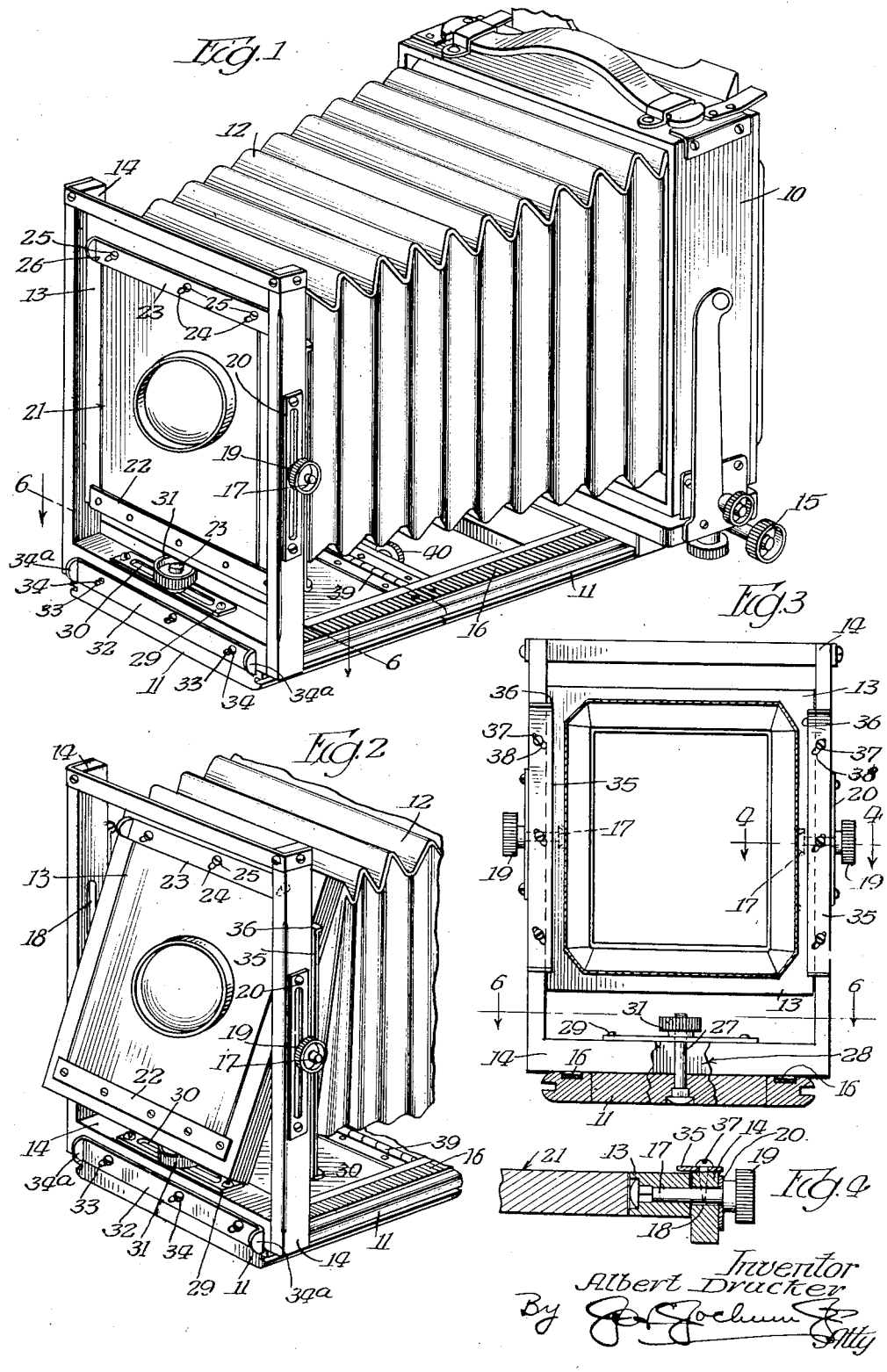

Aug. 18, 1942.  A. DRUCKER  2,293,598
CAMERA
Filed Feb. 26, 1940   2 Sheets-Sheet 2
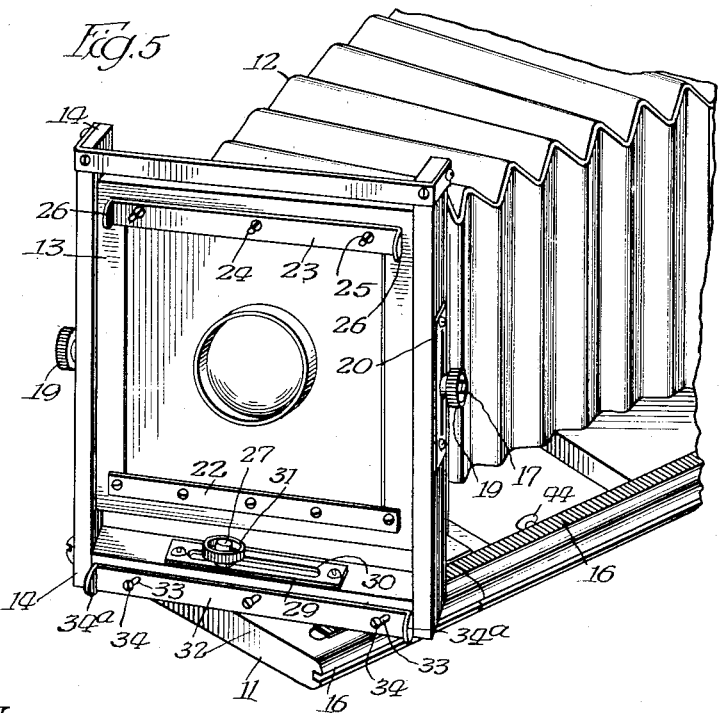
Inventor:
Albert Drucker
By [signature]
Atty.

Patented Aug. 18, 1942

2,293,598

UNITED STATES PATENT OFFICE 2,293,598

CAMERA

Albert Drucker, Chicago, Ill., assignor to Burke & James, Inc., Chicago, Ill., a corporation of Illinois Application February 26, 1940, Serial No. 320,834

2 Claims. (Cl. 95—50)

This invention relates in general to improvements in cameras, but more specifically to the front thereof, and one of the objects of the invention is to provide improved means for varying the position of the front or lens carrying board with relation to the other parts of the camera whereby the axis of the lens may be swung from a position normal to the plate to any desired angle either on a vertical or a horizontal axis, or both.

A further object is to provide improved simple and efficient and convenient means whereby such adjustment may be effected and maintained, and which means will be inconspicuous but conveniently located.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which—

Figure 1 is a perspective view of a camera having the front thereof constructed in accordance with the principles of this invention.

Figure 2 is a detail perspective view of the front end of the camera showing the front or lens carrying board tilted on a horizontal axis.

Figure 3 is a vertical sectional view taken on line 3—3 Figure 6 showing the front or lens carrying board in normal position.

Figure 4 is an enlarged detail sectional view taken on line 4—4 Figure 3.

Figure 5 is a view similar to Figure 2 showing the front frame and lens carrying board tilted on a vertical axis.

Figure 6 is a detail sectional view, on an enlarged scale, taken on line 6—6 Figure 3 and showing in dotted lines two different positions of the front or lens carrying board tilted on a vertical axis.

Referring more particularly to the drawings, the numeral 10 designates a camera mounted upon a support or base 11 and is provided with the usual extensible bellows 12 secured at the front end to a front or lens carrying board frame 13 mounted in a frame 14 at the front of the base. The camera is slidable upon the base 11 by means of operating shafts 15 to which is secured gears (not shown) that mesh with racks 16 extending along the base.

The lens board frame 13 is vertically adjustable in the frame 14, being mounted in suitable guides, and the adjustment may be effected in any suitable manner such as by means of stub shafts 17 secured to the frame 13 and which shafts extend through slots 18 in the frame 14. On the ends of the shafts 17 are threaded nuts or collars 19 and if desired a guide 20 may be secured to the face of the frame 14 and is provided with a slot that registers with the slot 18 in the frame 14. One of these adjusting means is provided on each side of the frame 14.

To adjust the frame 13 the nuts or collars 19 are loosened and serving as handles the slide 13 may be raised or lowered with respect to the frame 14 after which the nuts or collars 19 are tightened to hold the parts in their adjusted position.

The lens board 21 is removably secured in the frame 13 preferably by engaging at its lower end behind a plate or member 22 secured to the frame 13. Also secured to the frame 13 and opposite to the plate 22 is another plate or member 23 which is provided with diagonal slots 24 through which fastening elements such as screws 25, pass to engage the frame 13.

When the lens board is in position the plate 23 drops down in front of the lens board and cooperates with the plate 22. To remove the lens board the plate 23 is elevated and to facilitate such elevating movement the ends of the plate 23 may be deflected, as at 26, to form finger engaging portions.

The frame 14 is secured to the base 16 preferably by means of a screw or bolt 27 which passes through a slot 28 in the base of the frame and also preferably through a protection plate 29 that is secured to the base of the frame, and which plate has a slot 30 registering with the slot 28 in the frame. A nut or collar 31 is threaded upon the bolt and is adapted to be screwed tightly against the frame so as to hold the frame against swinging movement but when loosened the frame may be swung about the bolt as a pivot.

The slots 28 in the frame and the slot 30 in the plate 29 also serve as a means whereby the frame 14 may be given an edgewise adjustment with respect to the base 11. In order to hold the frame 14 against pivotal movement on a vertical axis during the edgewise adjustment, there is provided another plate or member 32 similar to the plate or member 23 and which is secured to the base of the frame 14.

This plate is also provided with inclined slots 33 through which fastening devices 34, such as screws or the like, pass into the frame and the plate is of such a width that when it is in its lowermost position with respect to the frame 14 it will engage over the front edge of the base 11 and thereby prevent such pivotal movement of the frame.

The lens board frame 13 is also adapted for swinging movement on a horizontal axis or on an axis transverse to the axis of the pivotal movement of the frame 14 so that the lens board frame may be tilted in a manner such as shown in Figure 2. This tilting movement of the lens board frame may be accomplished by moving the same about the stub shafts 17; after the nuts or collars 19 have been released, and after it has been moved to the desired position the nuts or collars are then again tightened.

In order to prevent the tilting of the lens board frame locking plates or members 35 similar to the locking plates 23 and 32 may be provided and these plates are secured to the rear of the uprights of the frame 14, the ends of such plates being deflected or shaped to form finger-engaging portions 36. The plates 35 are held in position by means of screws or fastening devices 37 passing through inclined slots 38 in the plate and one of the fastening plates may be arranged against each side of the frame 14. The slots are so positioned that the normal tendency of the locking plates 35 would be to move into locking position but, the fastening screws or members 37 may be so adjusted as to cause friction between the plates and the frame so that when the plates are raised to unlock the lens board frame the friction will hold them in their unlocked position.

When these plates 35 have been moved into an unlocking position the lens board frame 13 may be tilted about the stub shafts 17 and when in the desired position the nuts or collars 19 may be tightened so as to hold the frame in its adjusted position.

When the locking plate or member 32 is moved into an unlocking position and the nut or collar 31 loosened, the entire frame 14 may be swung about the bolt or member 27 into either of the positions shown in Figure 6 or to any other desired position on a vertical axis.

With this improved construction it will be manifest that the lens board frame may be adjusted into various positions.

Furthermore, the lens board frame is adapted for edgewise adjustment transverse to the base 11 by loosening the nut or collar 31 and by adjusting the frame 14.

The base 11 is of a sectional construction, the sections being connected together by means of a hinge 39 whereby the sections may be folded with respect to each other.

A screw or bolt 40 is mounted upon one of the sections and passes loosely through said section and engages in a threaded aperture 41 in the other section, when the sections are unfolded with respect to each other.

As an additional means for holding these sections rigid with respect to each other, an additional fastening bolt or pin 42 may be provided which is housed within one of the sections to slide loosely therein and to project, when the sections are unfolded with respect to each other, into an aperture 43 in the other section. One or more of these additional pins may be provided. The pin 42 is adapted to be operated by means of a handle 44 connected to the pin and extending through an aperture or slot 45 in a wall of an opening 46 in the section of the base by which it is carried.

It will therefore be manifest that the sections of the base will be braced or reinforced when they are unfolded with respect to each other by means other than and in addition to the screws or bolt 40.

All of these adjusting and locking elements are compactly arranged and are inconspicuous and at the same time one will not interfere with the other nor with the adjustment of the camera 10 with respect to the frame 14.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. In a camera, a fixed support, a front frame, a lens board frame mounted upon said front frame for rising and swinging adjustment with respect thereto, means mounting said front frame upon said support for edgewise sliding adjustment and for adjustment about a vertical pivot with respect thereto, means for maintaining said front frame against pivotal movement with respect to said fixed support, the last said means embodying an element provided with one or more inclined slots in its body, and pins individual to and passing through said slots for slidably connecting said element with its support, whereby upon edgewise movement of said element, said pins and slots will cause said element to be bodily moved into a position where it engages both said frame and fixed support.

2. In a camera, the combination of a front frame, a lens board frame mounted thereupon for vertical slidable adjustment with respect thereto, means for maintaining said board frame in any position to which it has been adjusted with respect to the said front frame, the said means also serving to mount said lens board frame for pivotal adjustment with respect to said front frame in any of the adjusted positions of the front frame, additional means for maintaining said lens board frame against tilting with respect to said front frame, said additional means being carried by one of the frames and engageable with the other of the frames and embodying an element provided with one or more inclined slots in its body, and pins individual to the slots and projecting therethrough for mounting said element for sliding movement with respect to its supporting frame whereby upon edgewise movement of said element, said pins and slots will cause the element to be bodily moved into an active or inactive position to lock or unlock the said frames one with relation to the other.

ALBERT DRUCKER.